C. GEIGER.
Grain-Rick Frame.

No. 225,589. Patented Mar. 16, 1880.

WITNESSES:
Henry N. Miller
C. Sedgwick

INVENTOR:
C. Geiger
BY Munn & Co
ATTORNEYS.

N. PETERS, PHOTO-LITHOGRAPHER, WASHINGTON, D. C.

UNITED STATES PATENT OFFICE.

CORNELIUS GEIGER, OF TARBOROUGH, GEORGIA.

GRAIN-RICK FRAME.

SPECIFICATION forming part of Letters Patent No. 225,589, dated March 16, 1880.

Application filed December 20, 1879.

*To all whom it may concern:*

Be it known that I, CORNELIUS GEIGER, of Tarborough, in the county of Camden and State of Georgia, have invented a new and Improved Grain-Rick Frame, of which the following is a specification.

My invention relates to portable grain-supporters, the object of which is to secure small grains from damage when stacked in the straw, especially on bottom lands subject to overflow, and particularly adapted for the use of rice-planters.

The invention consists in portable stands adapted for receiving rails or poles upon which the bundles of grain are to be placed, whereby the grain is secured above the ground, where it is free from injury and will dry rapidly.

Figure 1:
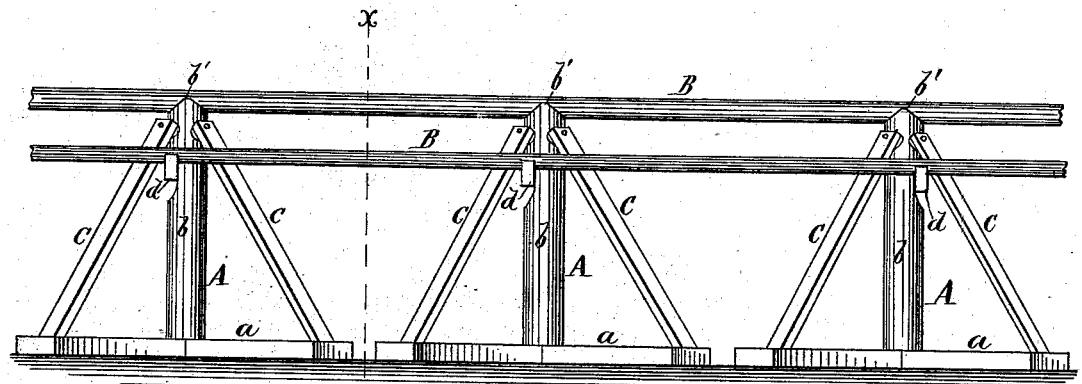
Figure 2:
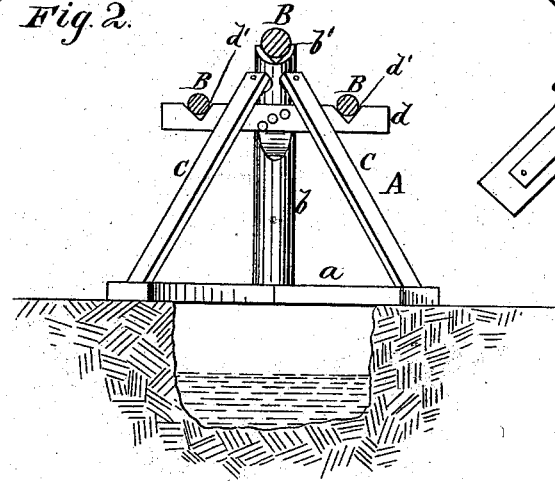
Figure 3:
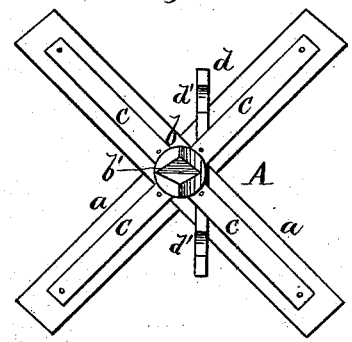

The improved apparatus is shown in the accompanying drawings, wherein Figure 1 is a side elevation. Fig. 2 is a vertical cross-section on line $x\ x$ of Fig. 1. Fig. 3 is a top view of one of the stands.

Similar letters of reference indicate corresponding parts.

A A are the portable stands which support the three horizontal ricks or poles B. The stands A are preferably made of wood, and about four feet in height. The base of each consists of cross-pieces $a$, halved together, the center post, $b$, sustained by braces $c$, and the cross-bar $d$, that is attached to the post $b$ near the top of post $b$. In the top of post $b$ is a groove or notch, $b'$, or recess, formed in any suitable manner, for receiving the top rail, B, and the bar $d$ is formed with projections or notches $d'$ at its ends, for receiving the side rails, B, one at each side of post $b$. The rails B will be of convenient size and length, the upper one being preferably the largest, and the stands A supporting the rails are to be placed a suitable distance apart for supporting the rails and the grain that is to be laid upon them. The apparatus is thus made portable, adapted for moving from place to place or remaining as a permanent fixture in the fields. In the latter case I prefer to place the stands A along the line of a ditch, as shown by Fig. 2, thereby permitting plowing and cultivation of the ground without interfering with the ricks.

In use, the bundles of grain will be hung over the top rail, B, by the heads, with the butts resting against the side rails, which hold the butts apart in stack shape. The bundles are to be placed in two or more tiers.

The ricks will hold a considerable quantity of grain, and in a manner that gives access of air beneath and around it, so that the grain will cure rapidly. The grain, being also elevated above the ground, will not be injured by floods or overflow of water-ways. This is especially advantageous on bottom lands in rice-growing, and the usual method of cocking the grain is dispensed with.

Having thus described my invention, I claim as new and desire to secure by Letters Patent—

The combination, with the base-pieces $a$, the posts $b$, and the cross-bars $d$, of the three rails B, one arranged on top of the posts and one on each side, a little below the top, to form the grain-rick frame shown and described.

CORNELIUS GEIGER.

Witnesses:
GEORGE J. STEWART,
JOSEPH DRURY.